(12) United States Patent
Liu

(10) Patent No.: US 10,368,036 B2
(45) Date of Patent: Jul. 30, 2019

(54) PAIR OF PARKING AREA SENSING CAMERAS, A PARKING AREA SENSING METHOD AND A PARKING AREA SENSING SYSTEM

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 275 days.

(21) Appl. No.: 15/354,575

(22) Filed: Nov. 17, 2016

(65) Prior Publication Data

US 2018/0139414 A1 May 17, 2018

(51) Int. Cl.
| | |
|---|---|
| *G08G 1/065* | (2006.01) |
| *H04N 7/18* | (2006.01) |
| *G08G 1/14* | (2006.01) |
| *G08G 1/04* | (2006.01) |

(52) U.S. Cl.
CPC .............. *H04N 7/181* (2013.01); *G08G 1/04* (2013.01); *G08G 1/142* (2013.01); *G08G 1/146* (2013.01)

(58) Field of Classification Search
CPC .......... G08G 1/146; G08G 1/04; G08G 1/142; H04N 7/181
See application file for complete search history.

(56) References Cited

U.S. PATENT DOCUMENTS

| | | | | |
|---|---|---|---|---|
| 5,940,481 A * | 8/1999 | Zeitman | ............... | G06Q 20/127 340/932.2 |
| 6,356,303 B1 * | 3/2002 | Shibata | .................. | H04N 5/232 348/211.1 |
| 6,678,394 B1 * | 1/2004 | Nichani | ............... | G05D 1/0251 348/169 |
| 7,116,246 B2 * | 10/2006 | Winter | ..................... | G08G 1/14 340/932.2 |
| 8,289,189 B2 * | 10/2012 | Becker | ..................... | B60R 1/00 340/932.2 |
| 8,584,388 B1 * | 11/2013 | Fujisaki | .................. | F41A 17/08 42/70.01 |
| 8,625,853 B2 * | 1/2014 | Carbonell | .......... | G06K 9/00785 382/104 |

(Continued)

FOREIGN PATENT DOCUMENTS

| | | |
|---|---|---|
| CN | 203351029 | 12/2013 |
| TW | 200519788 | 6/2005 |

(Continued)

OTHER PUBLICATIONS

Office Action issued in corresponding Taiwan patent application dated Jul. 3, 2017, 4 pages.

*Primary Examiner* — Sathyanaraya V Perungavoor
*Assistant Examiner* — Philip P. Dang
(74) *Attorney, Agent, or Firm* — Andrew M. Calderon; Roberts Mlotkowski Safran Cole & Calderon, P.C.

(57) ABSTRACT

A pair of parking area sensing cameras, comprising a first parking area sensing camera configured to monitor a first parking area and generate a parking area status of the first parking area and a second parking area sensing camera configured to monitor a second parking area and generate a parking area status of the second parking area. The first parking area sensing camera is configured to display the parking area status of the second parking area.

9 Claims, 7 Drawing Sheets

(56) References Cited

U.S. PATENT DOCUMENTS

| | | | | |
|---|---|---|---|---|
| 8,896,694 B2* | 11/2014 | O'Donnell | | G08C 17/02 |
| | | | | 348/143 |
| 9,004,353 B1* | 4/2015 | Block | | G06Q 20/1085 |
| | | | | 235/379 |
| 9,111,145 B2* | 8/2015 | Carbonell | | G06K 9/00785 |
| 9,148,585 B2* | 9/2015 | Cragun | | H04N 5/247 |
| 9,467,679 B2* | 10/2016 | Wakabayashi | | G08G 1/168 |
| 2006/0232680 A1* | 10/2006 | van Geel | | H04N 5/222 |
| | | | | 348/211.99 |
| 2006/0274171 A1* | 12/2006 | Wang | | G06K 7/14 |
| | | | | 348/294 |
| 2007/0130600 A1* | 6/2007 | Yanai | | G08B 13/19676 |
| | | | | 725/105 |
| 2012/0299749 A1* | 11/2012 | Xiao | | G08G 1/04 |
| | | | | 340/932.2 |
| 2013/0132102 A1* | 5/2013 | Andrade | | G06Q 50/30 |
| | | | | 705/1.1 |
| 2013/0258107 A1* | 10/2013 | Delibaltov | | G06K 9/00785 |
| | | | | 348/148 |
| 2013/0266190 A1* | 10/2013 | Wang | | G06K 9/3258 |
| | | | | 382/105 |
| 2014/0015981 A1* | 1/2014 | Dietl | | H04N 7/18 |
| | | | | 348/159 |
| 2014/0176348 A1* | 6/2014 | Acker, Jr. | | G08G 1/144 |
| | | | | 340/932.2 |
| 2014/0200970 A1* | 7/2014 | Nerayoff | | H04N 7/181 |
| | | | | 705/13 |
| 2014/0267775 A1* | 9/2014 | Lablans | | H04N 5/247 |
| | | | | 348/169 |
| 2015/0042815 A1* | 2/2015 | Park | | H04N 7/181 |
| | | | | 348/159 |
| 2015/0170518 A1* | 6/2015 | Rodriguez Garza | | G08G 1/144 |
| | | | | 340/932.2 |
| 2015/0288923 A1* | 10/2015 | Kim | | H04N 5/23296 |
| | | | | 348/14.05 |
| 2015/0358573 A1* | 12/2015 | Kardashov | | H04W 4/70 |
| | | | | 348/552 |
| 2016/0042643 A1* | 2/2016 | Hohenacker | | G08G 1/04 |
| | | | | 705/13 |
| 2016/0127626 A1* | 5/2016 | Horigome | | H04N 7/181 |
| | | | | 348/159 |
| 2016/0307047 A1* | 10/2016 | Krishnamoorthy | | G06T 7/73 |
| 2016/0307048 A1* | 10/2016 | Krishnamoorthy | | G06K 9/00771 |

FOREIGN PATENT DOCUMENTS

| | | |
|---|---|---|
| TW | 200603019 | 1/2006 |
| TW | M429953 | 5/2012 |

* cited by examiner

PAIR OF PARKING AREA SENSING CAMERAS, A PARKING AREA SENSING METHOD AND A PARKING AREA SENSING SYSTEM

BACKGROUND OF THE INVENTION

1. Field of the Invention

The present invention relates to a pair of parking area sensing cameras, a parking area sensing method and a parking area sensing system, and more particularly, to a pair of parking area sensing cameras, a parking area sensing method and a parking area sensing system capable of reducing hardware and installation cost, and increasing convenient of users.

2. Description of the Related Art

As shown in FIG. 1, a conventional parking area sensing camera is mounted above and in front of a target parking area to be sensed. The sensing camera body includes an indication light. A parking area A includes one or more parking spaces, for example, parking space A1, parking space A2, and parking space A3. Each conventional parking area sensing camera is usually responsible for one or two parking spaces. When the parking area sensing camera senses at least one unoccupied parking space, it displays a green indication light. If, however, it senses that all parking spaces are occupied, it displays a red indication light. Because the distance between the target parking area to be sensed and the conventional parking area sensing camera is short, the field of view of the parking area sensing camera is narrow. Therefore, each conventional parking area sensing camera can only senses one or two parking spaces.

FIG. 2 shows another conventional parking area sensing camera mounted above a driving lane in a parking lot. This conventional parking area sensing camera has two lenses, each of which captures images of at least one parking space of a parking area at a different side of the driving lane. When the parking area sensing camera senses at least one unoccupied parking space, it displays a green indication light. If, however, it senses that all parking spaces are occupied, it displays a red indication light. One drawback of this design is that the hardware and mechanism of the parking area sensing camera are complicated because two lenses need to be integrated into one single camera housing. Another drawback of this design is that the firmware and software of the parking area sensing camera are complicated because two video inputs need to be processed. Still another drawback of this design is that car drivers watching the indication light alone cannot tell if the unoccupied parking space is located at the right side or the left side of the lane. Also, because the distance between the target parking area to be sensed and the conventional parking area sensing camera is short, the field of view of the parking area sensing camera is still narrow. Therefore, each conventional parking area sensing camera can only senses a few parking spaces.

SUMMARY OF THE INVENTION

The present invention provides a pair of parking area sensing cameras, a parking area sensing method and a parking area sensing system for solving above drawbacks.

In accordance with a first aspect of the present invention, a pair of parking area sensing cameras comprises a first parking area sensing camera configured to monitor a first parking area and generate a parking area status of the first parking area, and a second parking area sensing camera configured to monitor a second parking area and generate a parking area status of the second parking area. The first parking area sensing camera is configured to display the parking area status of the second parking area.

In accordance with a second aspect of the present invention, a method for sensing parking area comprises monitoring a first parking area and generating a parking area status of a first parking area by a first parking area sensing camera, monitoring a second parking area and generating a parking area status of a second parking area by a second parking area sensing camera, and displaying the parking area status of the second parking area on the first parking area sensing camera.

In accordance with a third aspect of the present invention, a parking area sensing system comprises: a parking lot, including a first parking area and a second parking area; a first parking area sensing camera configured to monitor a first parking area and generate a parking area status of the first parking area; a second parking area sensing camera configured to monitor a second parking area and generate a parking area status of the second parking area; wherein the first parking area sensing camera is configured to display the parking area status of the second parking area.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
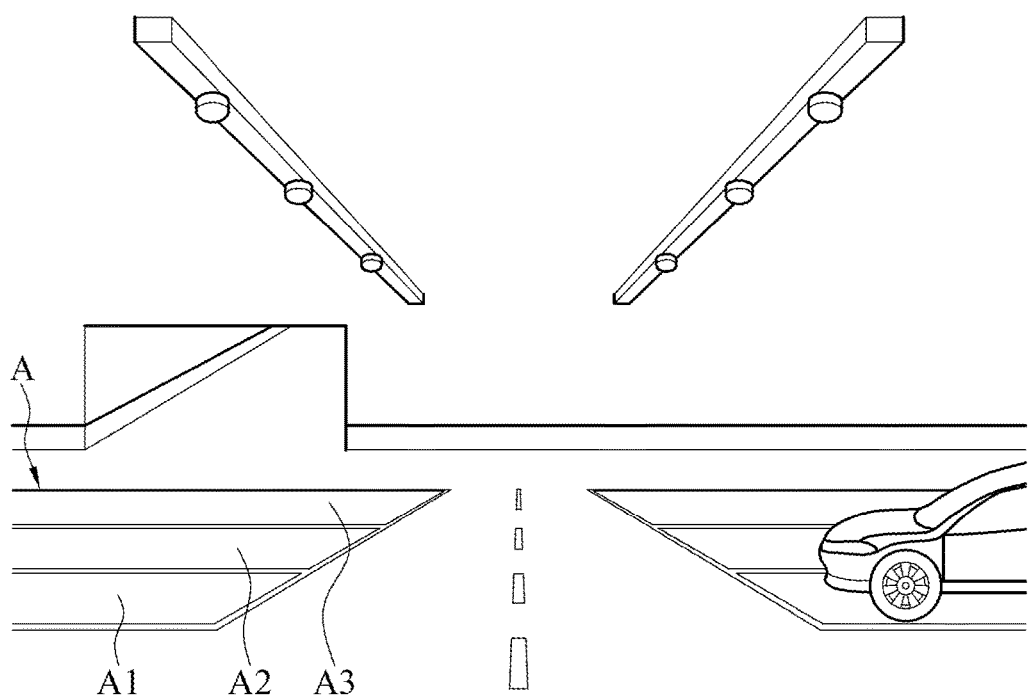
FIG. 1 is a schematic diagram of a conventional parking area sensing camera.
Figure 2:
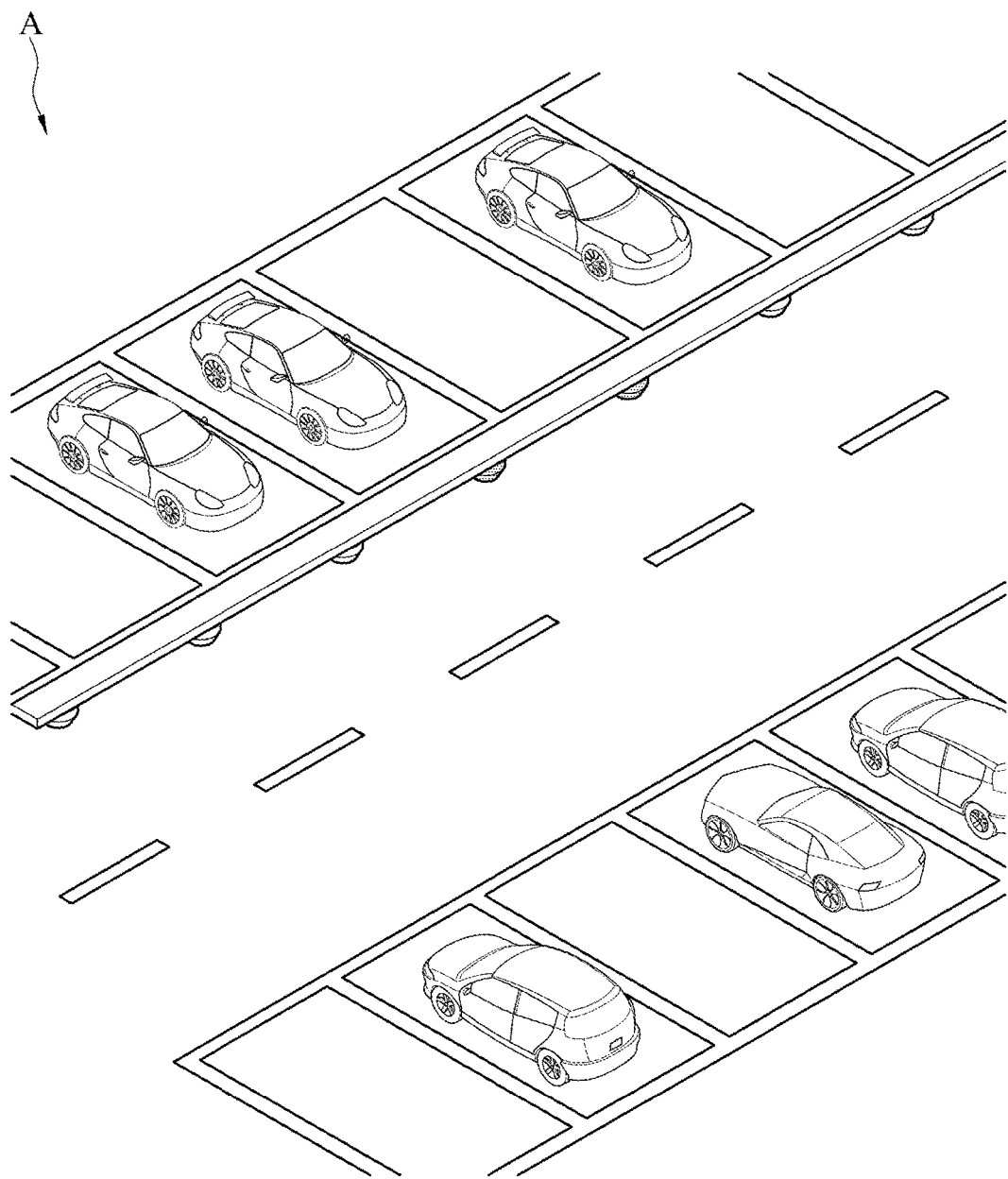
FIG. 2 is a schematic diagram of another conventional parking area sensing camera.
Figure 3:
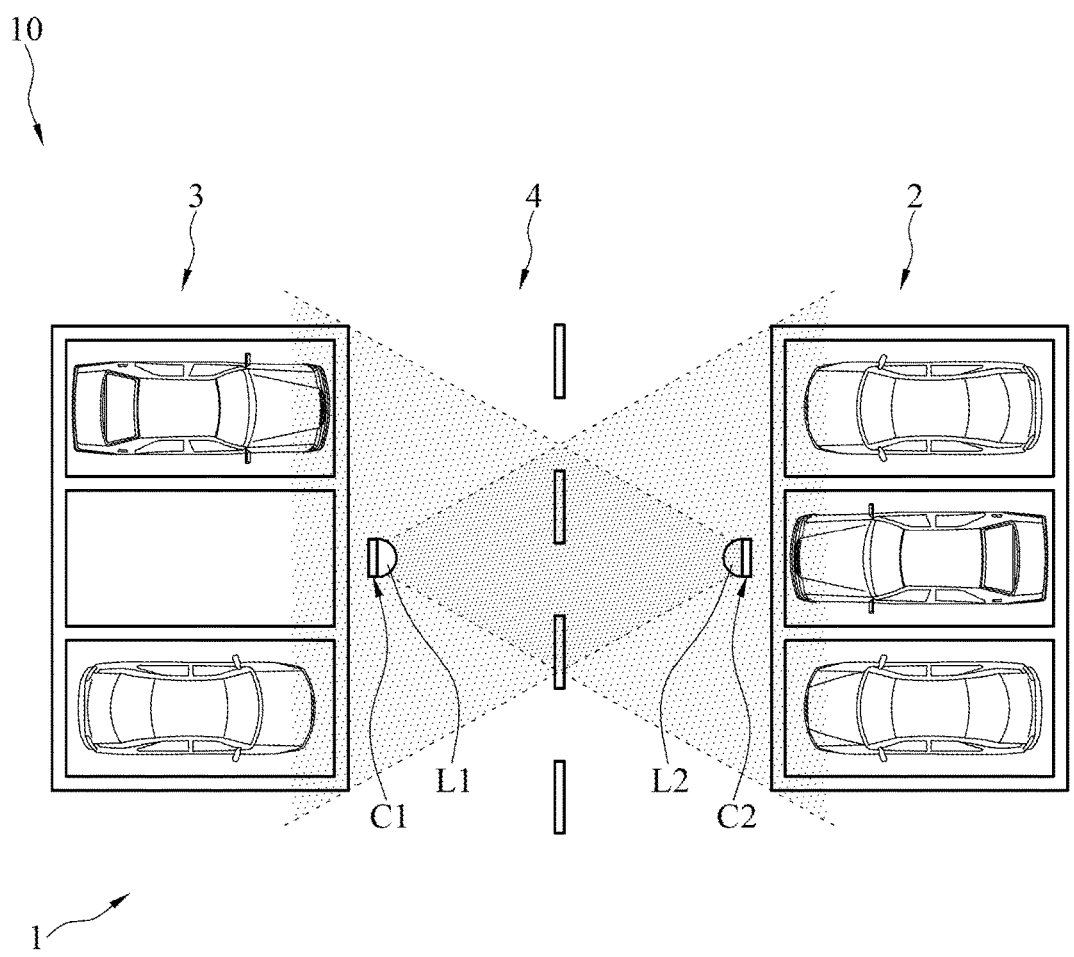
FIG. 3 is a schematic top view of a parking area sensing system according to an embodiment of the present invention.

FIG. 3 is a schematic top view diagram of a parking area sensing system 10 according to an embodiment of the present invention. The parking area sensing system 10 includes a parking lot 1. The parking lot 1 has a driving lane 4, a first parking area 2 including one or more parking spaces at the right side of the driving lane 4, a second parking area 3 including one or more parking spaces at the left side of the driving lane 4. The first parking area 2 and the second parking area 3 are separated from each other by the driving lane 4. It should be noticed that although the illustrated embodiment shows that each of the parking areas 2 and 3 has three (3) parking spaces, the number of the parking spaces are not limited to three (3), and can be one or more than one parking space.

In the illustrated embodiment, the parking area sensing system 10 also includes a first parking area sensing camera C1, which is configured to monitor the first parking area 2 and generate the parking status of first parking area 2. In an embodiment, there can be two (2) parking statuses: "full" (which means all parking spaces are occupied), and "empty" (which means at least one parking space is unoccupied). It should be noticed that the number of parking statuses is not limited to two (2) according to an embodiment of the present invention. For example, according to another embodiment of the present invention, there can be three (3) parking statuses: "full" (which means all parking spaces are occupied), "empty" (which means all parking spaces are unoccupied), and "partial empty" (which means some but not all of the parking spaces are occupied). In other words, the parking status of first parking area 3 is available to park. As illustrated in FIG. 3, all three (3) parking spaces at the right side are occupied, so the parking status of the first parking area 2 is "full." Any existing imaging processing algorithm for determining the occupation status of a parking space or parking spaces can be used in the present invention, for example, Fabian, Tomas. "An algorithm for parking lot occupation detection." Computer Information Systems and Industrial Management Applications, 2008. CISIM'08. 7th. IEEE, 2008, and Yusnita, R., Fariza Norbaya, and Norazwinawati Basharuddin. "Intelligent Parking Space Detection System Based onImage Processing." International Journal of Innovation, Management and Technology 3.3 (2012): 232.

The parking area sensing system 10 also includes a second parking area sensing camera C2, which is similar to the first parking area sensing camera C1 and configured to monitor the second parking area 3 and generate the parking status of second parking area 3. As illustrated in FIG. 3, only two (2) parking spaces are occupied at the left side, so the parking status of the second parking area 3 is "empty" or "partial empty." In other words, the parking status of second parking area 3 is available to park.

Figure 4:
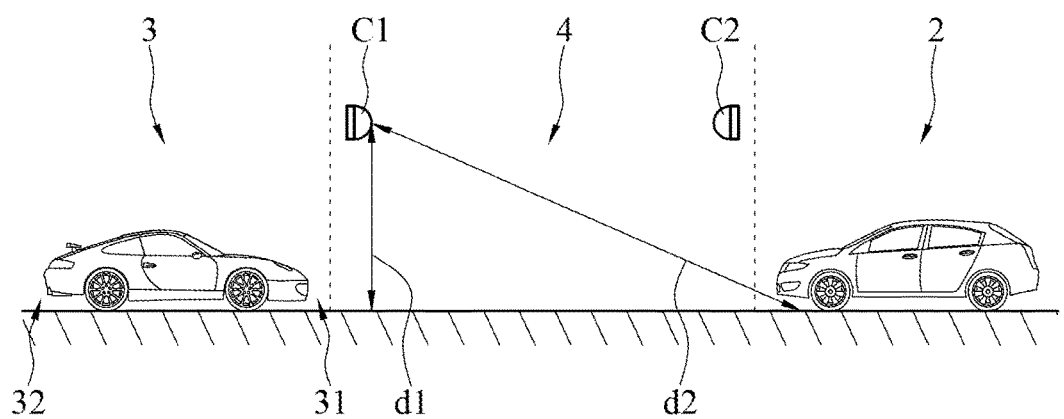
FIG. 4 is a schematic side view of a parking area sensing system according to an embodiment of the present invention.

As shown in FIG. 3, the first parking area sensing camera C1 for sensing the first parking area 2 is mounted above and closer to the second parking area 3 than to the first parking area 2. It should be noted that although the first parking area sensing camera C1 is used to sense the first parking area 2, it is mounted closer to the second parking area 3 than to the first parking area 2. By doing so, the distance between the first parking area sensing camera C1 and the target (i.e., the first parking area 2) is increased compared to the conventional parking area sensing system. As a result, the field of view of the first parking area sensing camera C1 is larger compared to the parking area sensing camera in the conventional parking area sensing system, and is capable of sensing more parking spaces compared to the parking area sensing camera in the conventional parking area sensing system. More specifically, FIG. 4 is a schematic side view of a parking area sensing system according to an embodiment of the present invention. As FIG. 4 illustrates, the shortest distance d1 between the first parking area sensing camera C1 and the second parking area 3, is shorter than the shortest distance d2 between the first parking area sensing camera C1 and the first parking area 2. Similarly, the second parking area sensing camera C2 for sensing the second parking area 3 is mounted above and closer to the first parking area 2 than to the second parking area 3. It should be noted that although in FIG. 4 the first parking area sensing camera C1 is mounted closer to the front end 31 of the second parking area 3 than to the back end 32 of the second parking area 3, it is not limited according to an embodiment of the present invention. For example, according to another embodiment of the present invention, the first parking area sensing camera C1 is mounted closer to the back end 32 of the second parking area 3 than to the front end 31 of the second parking area 3.

Figure 3A:
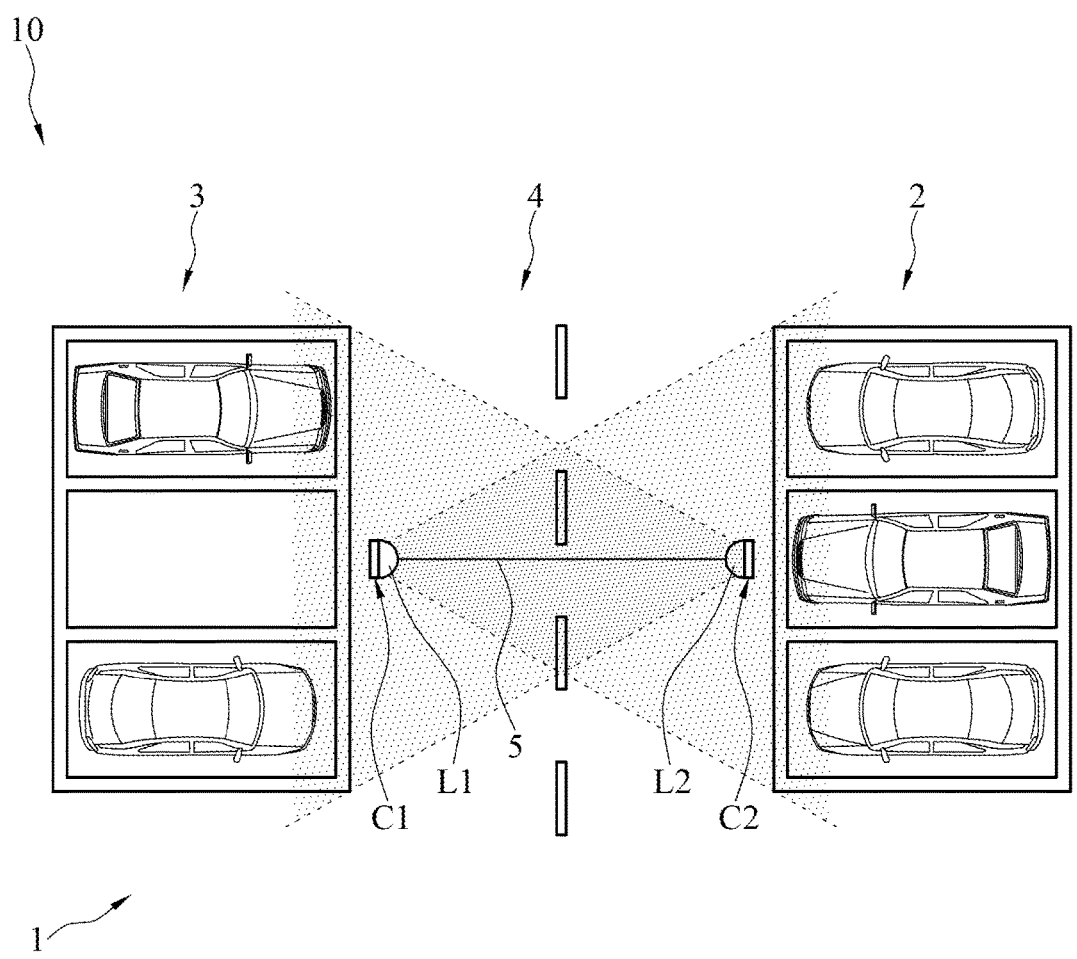
FIG. 3A is a schematic top view of a peered parking area sensing system according to an embodiment of the present invention.

FIG. 3A is a schematic top view of a peered parking area sensing system according to an embodiment of the present invention. As FIG. 3A illustrates, the first parking area sensing camera C1 is connected to the second parking area sensing camera C2 through a connection 5.

In an embodiment, the second parking area sensing camera C2 transmits the parking status of the second parking area 3 directly to the first area space sensing camera C1 through the connection 5, without going through a server or another host, and the first parking area sensing camera C1 receives the parking status of the second parking area 3 directly from second parking area sensing camera C2 through the connection 5, without going through a server or another host.

After receiving the parking status of the second parking area 3, the first parking area sensing camera C1 displays the parking status of the second parking area 3 through its build-in display mechanism, for example, a LED light. As FIG. 3 illustrates, the first parking area sensing camera C1 displays the parking status of the second parking area 3 generated by the second parking area sensing camera C2 through the LED light L1.

As FIG. 3A illustrates, the second parking area sensing camera C2 is also connected to first parking area sensing camera C1 through the same connection 5. In the illustrated embodiment, the first parking area sensing camera C1 transmits the parking status of the first parking area 2 directly to the second area space sensing camera C2 through the connection 5, without going through a server or another host. The second parking area sensing camera C2 receives the parking status of the first parking area 2 directly from the first parking area sensing camera C1 through the connection 5, without going through a server or another host.

After receiving the parking status of the first parking area 2, the second parking area sensing camera C2 displays the parking status of the first parking area 2 through its build-in display mechanism, for example, a LED light. As FIG. 3 illustrates, the second parking area sensing camera C2 displays the parking status of the first parking area 2 generated by first parking area sensing camera C1 through the LED light L2.

Figure 3B:
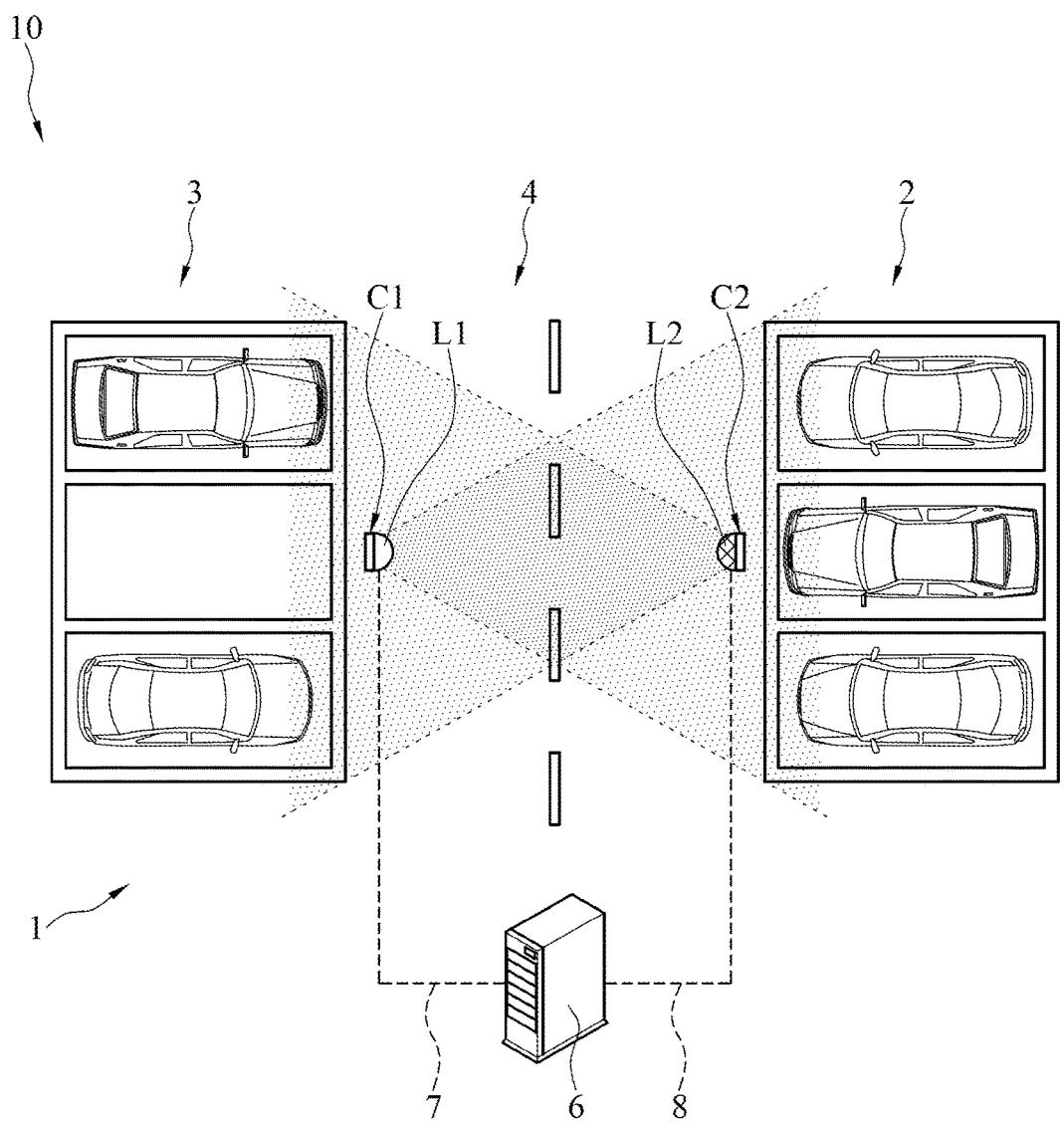
FIG. 3B is a schematic top view of a central controlled parking area sensing system according to an embodiment of the present invention.

FIG. 3B is a schematic top view of a central controlled parking area sensing system according to an embodiment of the present invention. As FIG. 3B illustrates, the first parking area sensing camera C1 connects to a central server 6 through a connection 7, and the second parking area sensing camera C2 connects to the central server 6 through a connection 8.

In an embodiment, the second parking area sensing camera C2 transmits the generated parking status of the second parking area 3 to the central server 6 through the connection 8. The first parking area sensing camera C1 receives the parking status of the second parking area 3 from the central server 6 through the connection 7.

After receiving the parking status of the second parking area 3, the first parking area sensing camera C1 displays the parking status of the second parking area 3 through its build-in display mechanism, for example, a LED light. As FIG. 3B illustrates, the first parking area sensing camera C1 displays the parking status of the second parking area 3 generated by the second parking area sensing camera C2 through light L1.

As FIG. 3B illustrates, the first parking area sensing camera C1 transmits the generated parking status of the first parking area 2 to the central server 6 through the connection 7. The second parking area sensing camera C2 receives the parking status of the first parking area 2 from the central server through the connection 8.

After receiving the parking status of first parking area 2, the second parking area sensing camera C2 displays the parking status of first parking area 2 through its build-in display mechanism, for example, an LED light. As FIG. 3B illustrates, the second parking area sensing camera C2 displays the parking status of first parking area 2 generated by first parking area sensing camera C1 through light L2.

In some embodiments, each of the connection 5, the connection 7, and the connection 8 can be wired or wireless. For example, in some embodiments, the connection 5, the connection 7, and the connection 8 can be an Ethernet connection going through at least one network hub or network router, an Ethernet connection without going through any network hub or network router, an USB (Universal Serial Bus) connection, a RS-232 connection, or a RS-485 connection.

In some embodiments, the first parking area sensing camera C1 in the above embodiments can transmit the parking status of the second parking area 2 periodically, for example, every one second. In some embodiments, the first parking area sensing camera C1 in the above embodiments can transmit the parking status of the second parking area 2 when the parking status of the second parking area 2 changes.

Similarly, in some embodiments, the second parking area sensing camera C2 in the above embodiments can transmit the parking status of the second parking area 3 periodically, for example, every one second. In some embodiments, the second parking area sensing camera C2 in the above embodiments can transmit the parking status of the second parking area 3 when the parking status of the second parking area 3 changes.

In some embodiments, coding of the parking status in the above embodiments can be textual, for example "empty", "full", "partial empty", or numeral, for example 1 (represents empty), 2 (represents full), 3 (represents partial empty), or binary, for example 00 (represents empty), 01 (represents full), 10 (represents partial empty).

In some embodiments, a mapping between the indication (e.g., color) of the LED light (L1 and/or L2) and the parking status in the above embodiments can be, for example: green representing "empty", red representing "full", orange representing "partial empty."

Figure 5:
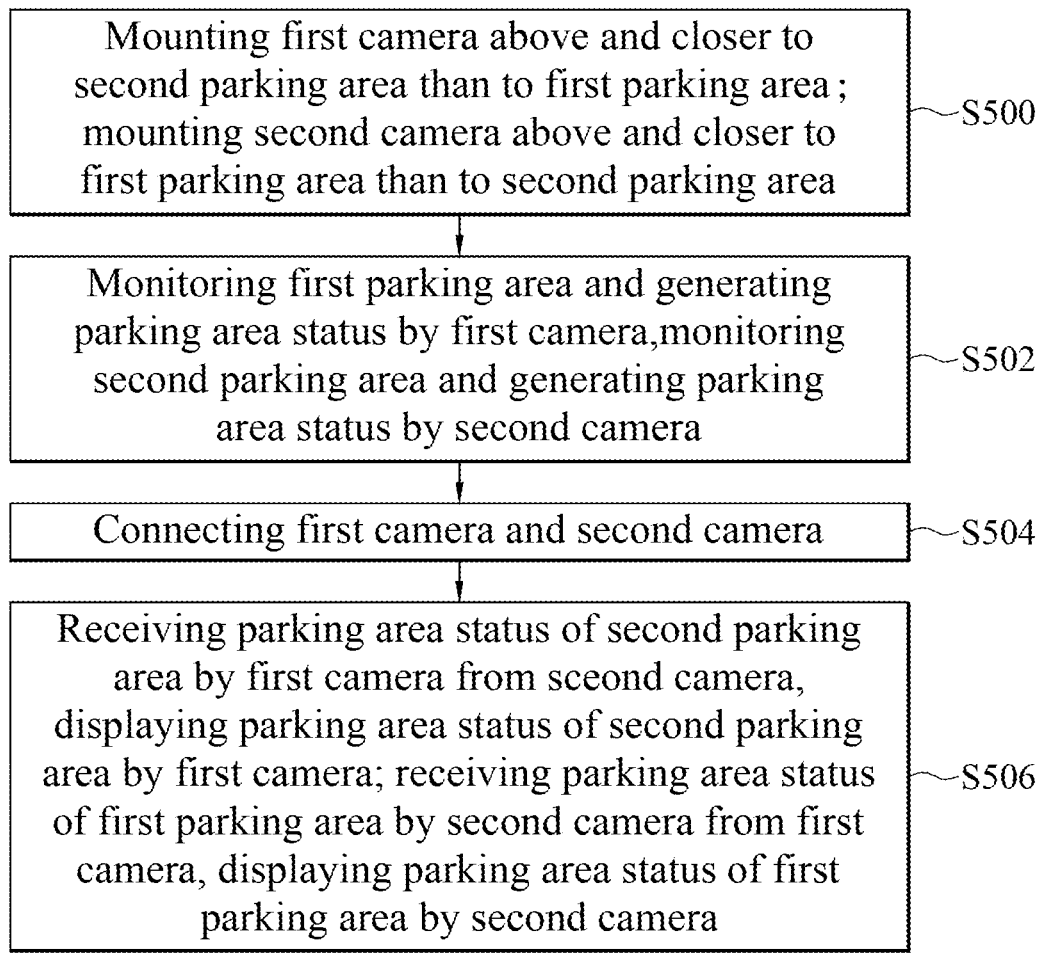
FIG. 5 is a flow chart of a parking area sensing method according to an embodiment of the present invention.

FIG. 5 is a flow chart of a parking area sensing method according to an embodiment of the present invention, which can be applied to a parking area sensing system as shown in FIGS. 3, 3A and/or 3B. In particular, in step S500, the first parking area sensing camera C1 is mounted above and closer to the second parking area 3 than to the first parking area 2, and the second parking area sensing camera C2 is mounted above and closer to the first parking area 2 than to the second parking area 3, as shown in FIG. 3 and FIG. 4. Then, in step S502, first parking area sensing camera C1 monitors the first parking area 2 and generates the parking area status of the first parking area 2, and the second parking area sensing camera C2 monitors the second parking area 3 and generates the parking area status of the second parking area 3. Then, in step S504, the first parking area sensing camera C1 and second parking area sensing camera C2 are connected. In a peered parking area sensing system according to an embodiment of the present invention, the first parking area sensing camera C1 and the second parking area sensing camera C2 are connected through the connection 5 as shown in FIG. 3A. In a central controlled parking area sensing system according to an embodiment of the present invention, the first parking area sensing camera C1 is connected to the central server 6 through the connection 7, and the second parking area sensing camera C2 is connected to the central server 6 through the connection 8, as shown in FIG. 3B.

Then, in step S506, the first parking area sensing camera C1 receives the parking area status of the second parking area 3 from the second parking area sensing camera C2, and then displays the parking area status of the second parking area 3. Similarly, the second parking area sensing camera C2 receives the parking area status of the first parking area 2 from the first parking area sensing camera C1, and then displays the parking area status of the first parking area 2. In a peered parking area sensing system according to an embodiment of the present invention, the first parking area sensing camera C1 receives the parking area status of the second parking area 3 directly from the second parking area sensing camera C2 without through central server, and the second parking area sensing camera C2 receives the parking area status of the first parking area 2 directly from the first parking area sensing camera C1 without through central server. In a central controlled parking area sensing system according to an embodiment of the present invention, the first parking area sensing camera C1 receives the parking area status of the second parking area 3 from the second parking area sensing camera C2 through the central server 6, and the second parking area sensing camera C2 receives the parking area status of the first parking area 2 from the first parking area sensing camera C1 through the central server 6.

It should be noted that in an embodiment of the present invention that includes the central server 6, the parking area sensing camera can transmit the captured image of the parking area sensed to the central server 6, and the parking status of the parking area sensed can be generated by the central server 6 using any existing imaging processing algorithm for determining the occupation status of a parking space or parking spaces, for example, Fabian, Tomas. "An algorithm for parking lot occupation detection." Computer Information Systems and Industrial Management Applications, 2008. CISIM'08. 7th. IEEE, 2008, and Yusnita, R., Fariza Norbaya, and Norazwinawati Basharuddin. "Intelligent Parking Space Detection System Based on Image Processing." International Journal of Innovation, Management and Technology 3.3 (2012): 232.

In view of the above, in the illustrated embodiments, the first parking area sensing camera C1 for sensing the first parking area 2 is mounted above and closer to the second parking area 3 than to the first parking area 2, and the second parking area sensing camera C2 for sensing the second parking area 3 is mounted above and closer to the first parking area 2 than to the second parking area 3, such that the distance between the first parking area sensing camera C1 and the first parking area 2 and the distance between the second parking area sensing camera C2 and the second parking area 3 are significantly increased compared to the conventional parking area sensing system. As a result, the field of view of the first parking area sensing camera C1 and the field of view of the second parking area sensing camera C2 are significantly increased so as to sense more parking spaces. By paring the first parking area sensing camera C1 and the second parking area sensing camera C2 and using the first parking area sensing camera C1 (the second parking area sensing camera C2) to display the parking status of the parking area sensed by the second parking area sensing camera C2 (the first parking area sensing camera C1), the drivers watching the display/indication light of the first parking area sensing camera C1 (the second parking area sensing camera C2) can intuitively tell whether the parking area where the first parking area sensing camera C1 (the second parking area sensing camera C2) are mounted/located has any unoccupied parking spaces. In view of the above, the arrangement of the pair of the parking area sensing cameras allows monitoring larger/more parking areas with less parking area sensing cameras and corresponding hardware and less installation cost, and make it more convenient for the car drivers to tell whether there are any unoccupied parking spaces based on the display/indication light of the parking area sensing cameras. In addition, angles of incidence between lens of the first parking area sensing camera C1 and license plates of the cars in the first parking area 2 are decreased, thus the accuracy rate of the license plate recognition increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pair of parking area sensing cameras, comprising:
a first parking area sensing camera configured to monitor a first parking area and generate a parking area status of the first parking area;
a second parking area sensing camera configured to monitor a second parking area different from the first parking area and generate a parking area status of the second parking area; and
wherein the first parking area sensing camera is configured to display the parking area status of the second parking area, wherein the parking area status of the second parking area is available to park;
wherein the first parking area sensing camera is connected to the second parking area sensing camera through an Ethernet connection, and the first parking area sensing camera is configured to receive the parking area status of the second parking area directly from the second parking area sensing camera;
wherein the first parking area sensing camera is mounted above and closer to the second parking area than to the first parking area, and the second parking area sensing camera is mounted above and closer to the first parking area than to the second parking area;
wherein the first parking area and the second parking area are separate from each other by a driving lane in a parking lot;
wherein the second parking area sensing camera is configured to receive the parking area status of the first parking area, and the second parking area sensing camera is configured to display the parking area status of the first parking area on an LED light; and
wherein the first parking area sensing camera is configured to display the parking area status of the second parking area on an LED light.

2. The pair of parking area sensing cameras according to claim 1, wherein both the first parking area sensing camera and the second parking area sensing camera are connected to a central server.

3. The pair of parking area sensing cameras according to claim 2, wherein the second parking area sensing camera is configured to transmit the parking area status of the second parking area to the central server, and the first parking area sensing camera is configured to receive the parking area status of the second parking area from the central server.

4. A method for sensing parking area, comprising:
monitoring a first parking area and generating a parking area status of the first parking area by a first parking area sensing camera;
monitoring a second parking area different from the first parking area and generating a parking area status of the second parking area by a second parking area sensing camera; and
displaying the parking area status of the second parking area on the first parking area sensing camera, wherein the parking area status of the second parking area is available to park;
wherein the first parking area sensing camera is connected to the second parking area sensing camera through an Ethernet connection, and the first parking area sensing camera is configured to receive the parking area status of the second parking area directly from the second parking area sensing camera;
wherein the first parking area sensing camera is mounted above and closer to the second parking area than to the first parking area, and the second parking area sensing camera is mounted above and closer to the first parking area than to the second parking area;
wherein the first parking area and the second parking area are separate from each other by a driving lane in a parking lot;
wherein the second parking area sensing camera is configured to receive the parking area status of the first parking area, and the second parking area sensing camera is configured to display the parking area status of the first parking area on an LED light; and
wherein the first parking area sensing camera is configured to display the parking area status of the second parking area on an LED light.

5. The method for sensing parking area according to claim 4, further comprising:
connecting both the first parking area sensing camera and the second parking area sensing camera to a central server.

6. The method for sensing parking area according to claim 5, further comprising:
transmitting the parking area status of the second parking area by the second parking area sensing camera to the central server; and
receiving the parking area status of the second parking area by the first parking area sensing camera from the central server.

7. A parking area sensing system, comprising:
a parking lot, including a first parking area and a second parking area;
a first parking area sensing camera configured to monitor a first parking area and generate a parking area status of the first parking area;
a second parking area sensing camera configured to monitor a second parking area different from the first parking area and generate a parking area status of the second parking area; and
wherein the first parking area sensing camera is configured to display the parking area status of the second parking area, wherein the parking area status of the second parking area is available to park;
the first parking area sensing camera is connected to the second parking area sensing camera through an Ethernet connection, and the first parking area sensing camera is configured to receive the parking area status of the second parking area directly from the second parking area sensing camera; and wherein the first parking area sensing camera is mounted above and closer to the second parking area than to the first parking area, and the second parking area sensing camera is mounted above and closer to the first parking area than to the second parking area; and wherein the first parking area and the second parking area are separate from each other by a driving lane in the parking lot; and wherein the second parking area sensing camera is configured to receive the parking area status of the first parking area, and the second parking area sensing camera is configured to display the parking area status of the first parking area on an LED light; and wherein the first parking area sensing camera is configured to display the parking area status of the second parking area on an LED light.

8. The parking area sensing system according to claim 7, wherein both the first parking area sensing camera and the second parking area sensing camera are connected to a central server.

9. The parking area sensing system according to claim 8, wherein the second parking area sensing camera is configured to transmit the parking area status of the second parking area to the central server, and the first parking area sensing camera is configured to receive the parking area status of the second parking area from the central server.

\* \* \* \* \*